(12) United States Patent
Zwiegincew et al.

(10) Patent No.: US 11,847,329 B2
(45) Date of Patent: *Dec. 19, 2023

(54) TECHNIQUES FOR IMPLEMENTING FAULT DOMAIN SETS

(71) Applicant: salesforce.com, inc., San Francisco, CA (US)

(72) Inventors: Arthur Zwiegincew, Emerald Hills, CA (US); Michael Grass, Kenmore, WA (US); Ian Chakeres, Burlingame, CA (US); Dhiraj Hegde, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,765

(22) Filed: Dec. 5, 2022

(65) Prior Publication Data
US 2023/0205437 A1 Jun. 29, 2023

Related U.S. Application Data

(63) Continuation of application No. 15/885,386, filed on Jan. 31, 2018, now Pat. No. 11,520,506.

(51) Int. Cl.
*G06F 3/06* (2006.01)
*G06F 1/20* (2006.01)
*G06F 11/20* (2006.01)

(52) U.S. Cl.
CPC .......... *G06F 3/0632* (2013.01); *G06F 3/0604* (2013.01); *G06F 3/067* (2013.01);
(Continued)

(58) Field of Classification Search
CPC ....... G06F 3/0632; G06F 3/0644; G06F 3/067
See application file for complete search history.

(56) References Cited

U.S. PATENT DOCUMENTS 9,152,336 B1 10/2015 Chen et al.
2010/0198970 A1 8/2010 Ingle et al.
(Continued)

OTHER PUBLICATIONS

Concepts, What is Kubernetes?, https://kubernetes.io/docs/concepts/overview/what-is-kubernetes/, 8 pages. [Retrieved Jan. 31, 2018].
(Continued)

*Primary Examiner* — David Yi
*Assistant Examiner* — Nicholas A. Paperno
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to provisioning fault domain sets (FDS). In some embodiments, a computer server system implements an FDS for disseminating a storage service across a plurality of fault domains. To implement the FDS, in some embodiments, the computer server system access FDS data specifying a desired state of the FDS in which the storage service is disseminated across at least a particular number of fault domains. The computer server system may determine available resources of the plurality of fault domains and determine a current state of the FDS based on fault domains that have already been provisioned to the FDS. Based on at least the desired state of the FDS, the current state of the FDS, and the available resources, the computer server system provisions one or more additional fault domains to the FDS to reconcile the FDS's current state with the FDS's desired state.

20 Claims, 9 Drawing Sheets

(52) U.S. Cl.
CPC .......... *G06F 3/0619* (2013.01); *G06F 3/0631* (2013.01); *G06F 3/0644* (2013.01); *G06F 11/2094* (2013.01); *G06F 2201/805* (2013.01); *G06F 2201/82* (2013.01)

(56) References Cited

U.S. PATENT DOCUMENTS

| | | |
|---|---|---|
| 2013/0290295 A1 | 10/2013 | Soules et al. |
| 2014/0330948 A1 | 11/2014 | Dunn et al. |
| 2015/0100826 A1 | 4/2015 | Vujic et al. |
| 2015/0355971 A1 | 12/2015 | Becker-Szendy et al. |
| 2016/0371135 A1 | 12/2016 | Sarkar et al. |
| 2017/0168905 A1 | 6/2017 | Wu et al. |
| 2018/0260261 A1 | 9/2018 | Mohammed et al. |
| 2019/0208011 A1 | 7/2019 | Debojyoti et al. |
| 2019/0278483 A1 | 9/2019 | Mahmmod et al. |

OTHER PUBLICATIONS

Concepts, Custom Resources, https://kubernetes.io/docs/concepts/api-extension/custom-resources/, 11 pages. [Retrieved Jan. 31, 2018].
Concepts, Kubernetes Components, https://kubernetes.io/docs/concepts/overview/components/, 6 pages. [Retrieved Jan. 31, 2018].
Concepts, Understanding Kubernetes Objects, https://kubernetes.io/docs/concepts/overview/working-with-objects/kubernetes-objects/#understanding-kubernetes-objects, 5 pages. [Retrieved Jan. 31, 2018].
Kubernetes, API Conventions, Jun. 25, 2017, [retrieved from internet May 4, 2021][<URL:https://web.archive.org/web/20170625095543/https://github.com/kubernetes/community/blob/master/contributors/devel/api-conventions.md>] (Year: 2017).

TECHNIQUES FOR IMPLEMENTING FAULT DOMAIN SETS

The present application is a continuation of U.S. application Ser. No. 15/885,386, entitled "TECHNIQUES FOR IMPLEMENTING FAULT DOMAIN SETS," filed Jan. 31, 2018, the disclosure of which is incorporated by reference herein in its entirety.

BACKGROUND

Technical Field

This disclosure relates generally to storage systems and, more specifically, the dissemination of services across fault domains.

Description of the Related Art

Large-scale computer systems have typically run applications inside their own virtual machines. Having a virtual machine for each application, however, usually results in many duplicate instances of the same operating system and many redundant boot volumes. Thus, running many applications becomes expensive. Accordingly, there has been a movement towards containerization. Particularly, an application and its dependencies can be packaged into a portable, self-sufficient unit called a container. Once a container has been generated, it may be provided to a computer system running a program such as Docker™ that handles instantiating the containerized application on that computer system. Multiple containers may be deployed on the same computer system without having to create a virtual machine for each containerized application.

Programs such as Docker™ may not always be efficient at deploying containerized applications across multiple computer systems, as each computer system may have its own instantiation of Docker™ running. Accordingly, large-scale deployment systems such as Kubernetes™ may be used for automating the deployment, scaling, and management of containerized applications across multiple computer systems. Such large-scale deployment systems may be aware of the computer systems in a cluster and thus can deploy the same containerized application on multiple computer systems (e.g., by instructing each Docker™ instance) in an automated manner. On the other hand, these large-scale deployment systems may lack knowledge regarding the fault-tolerant nature of the underlying hardware. Kubernetes™, for example, might deploy multiple instances of the same containerized application to the same server rack. Because all the computer systems in that rack may share a common power supply, if it failed, this would undesirably bring down all the computer systems in that rack.

Figure 1:
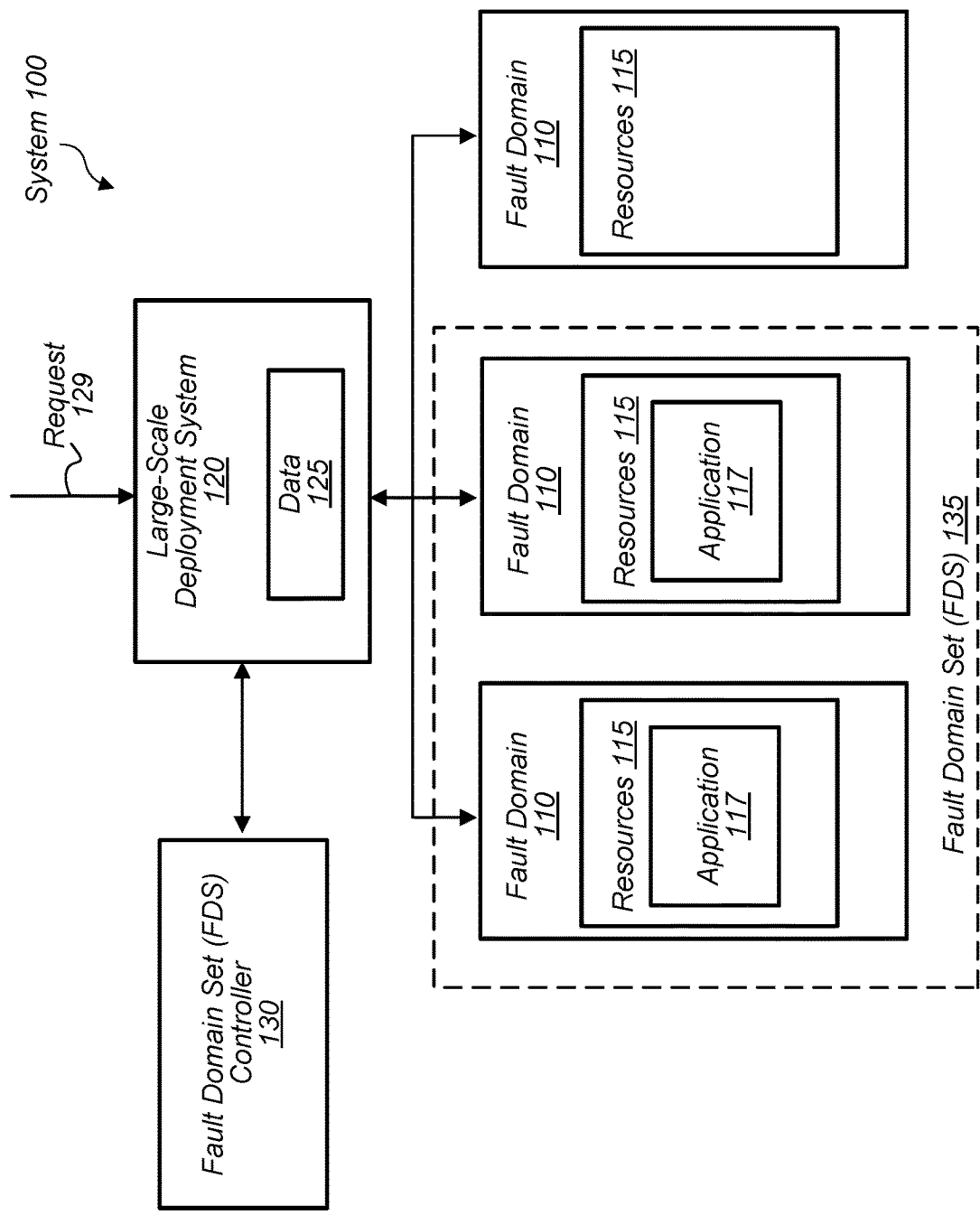
FIG. 1 is a block diagram illustrating exemplary elements of a system that facilitates provisioning and maintaining fault domain sets, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "node configured to execute an instance of a database management application" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a fault domain set having eight fault domains, the terms "first" and "second" fault domains can be used to refer to any two of the eight fault domains.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based on at least" or "based at least in part on."

DETAILED DESCRIPTION

In a data processing center (e.g., a server warehouse), there may be multiple server systems that are grouped together as a result of the underlying infrastructure. For example, a data processing center may include multiple server racks, which each include a group of server systems. A server rack may be considered a fault domain. As used herein, the term "fault domain" refers to a set of hardware components that share at least one common point of failure. For a server rack, the point of failure may be a power supply that supplies power to all server systems in that rack. If that power supply fails, then all server systems in that rack will crash. Accordingly, in order to ensure that an application/service is almost always available and to avoid the issues of a single fault domain, a provider of the application may want to run that application on hardware within multiple fault domains. A grouping of one or more fault domains is referred to herein as a fault domain set. As such, a new type of controller (a "fault domain set (FDS) controller") is described below that facilitates the provisioning of an application on hardware across multiple fault domains of a fault domain set.

The present disclosure describes techniques for provisioning and maintaining fault domain sets (FDS) that include fault domains across which an application such as a storage service may be disseminated. In various embodiments described below, an FDS controller interfaces with a large-scale deployment system (e.g., Kubernetes™) to implement an FDS for disseminating a storage service such as Ceph™ across multiple fault domains within a computer server system (e.g., a data processing center). In various embodiments, the FDS controller accesses FDS data that describes a desired state of the FDS in which the storage service is disseminated across at least some number of fault domains in the computer server system. The FDS controller may determine the resources (belonging to the fault domains) that are available for attaining the desired state. In some embodiments, the FDS controller determines a current state of the FDS based on the fault domains that have already been provisioned to the FDS. Based on the desired state of the FDS, the current state of the FDS, and the available resources, in various embodiments, the FDS controller provisions one or more additional fault domains to the FDS in order to reconcile the current state of the FDS with the desired state of the FDS.

These techniques may be advantageous as they may allow for services (e.g., storage services) to be distributed across multiple fault domains, protecting the services from being inaccessible when issues occur with a particular fault domain. Moreover, these techniques may allow for users to declaratively specify the dimensions of an FDS, including the number of desired fault domains within the FDS. In particular, this may allow users to specify different amounts of redundancy/fault-tolerance based on the service that they wish to deploy. Additionally, fault domains may not be symmetric in the resources (e.g., nodes, storage, etc.) that they contain. For example, one fault domain might include solid state drives for storage while another fault domain includes hard disk drives. Moreover, one fault domain may include more aggregate storage. These techniques, however, may allow an FDS to be created across a heterogeneous cluster of resources. These techniques may also extend the functionality of large-scale deployment systems as such systems lack knowledge about the fault-tolerant nature of the underlying hardware. A system for implementing these techniques will now be described in greater detail below, starting with FIG. 1.

Turning now to FIG. 1, a block diagram of a system 100 is shown. In the illustrated embodiment, system 100 includes fault domains 110, a large-scale deployment system 120, and a fault domain set (FDS) controller 130. As further depicted, fault domains 110 include resources 115 (some of which include application 117), and deployment system 120 includes data 125. While not shown, FDS controller 130 may include a local cache for storing data 125. In some embodiments, system 100 is implemented differently than shown—e.g., FDS controller 130 interacts directly with resources 115.

System 100, in various embodiments, is a set of server systems. System 100 may be a subset of server systems in a datacenter/server farm, a data center, multiple data centers, etc. In some cases, when system 100 encompasses multiple data centers, the components within system 100 may be located within different data centers. For example, deployment system 120 may be in one data center while fault domains 110 are within another. Users of system 100 may interact with the components within system 100. For example, a user may submit a request 129 to deployment system 120 for deploying an application 117.

Fault domains 110, in various embodiments, are each a collection of resources 115 such as computer nodes and storage volumes. Resources 115 within a given fault domain 110 may share at least one common point of failure. For example, a fault domain 110 may be a server rack that houses host systems, including storage disks. The components in that server rack may share a common power supply that represents a point of failure because if it failed, then the components connected to that power supply would shut down. In some cases, a fault domain 110 may be an entire data center (e.g., a server farm). Resources 115, in some embodiments, are usable by deployment system 120 (and FDS controller 130) for deploying applications 117 (which may include a storage service such as Ceph™). In various embodiments, applications 117 are containerized applications that may be instantiated by a platform such as Docker™. In some cases, such a platform may be running on various computer nodes within resources 115. These computer nodes, in various embodiments, are part of a computer cluster that is managed by deployment system 120.

Large-scale deployment system 120, in various embodiments, is a set of software routines that are executable to facilitate the deployment and management of containerized applications on resources 115. In various embodiments, deployment system 120 maintains data 125 describing resources 115 (e.g., computer nodes and storage volumes) accessible to system 120 for deploying applications 117— e.g., describes the computer cluster that is managed by deployment system 120. Data 125 may further describe desired states or goals for how resources 115 are to be used—e.g., describes what applications 117 to deploy and where to deploy them. Data 125 may be provided by users and/or FDS controller 130. For example, a user may instruct system 120 (via request 129) to deploy a particular application 117 on two fault domains 110, and FDS controller 130 may instruct system 120 on where to deploy that application 117 such that it is instantiated on two fault domains 110.

In various embodiments, system 120 periodically compares the current state of the computer cluster that it manages with the desired states described by data 125. System 120 may attempt to move the computer cluster towards the desired states. Consider an example in which data 125 indicates that a particular application 117 should be instantiated. In this example, system 120 may check the computer nodes of resources 115 to see if the particular application 117 is running. If it is not running on any computer node within resources 115, then system 120 may instruct one of the computer nodes (e.g., via Docker™) to run that application 117. When receiving a request to create a fault domain set (FDS) 135 for disseminating an application 117 across some number of fault domains 110, system 120 may notify FDS controller 130 about the request and may further provide data 125 to FDS controller 130. In some cases, FDS controller 130 may learn of the request when re-syncing the data within its local cache with data 125.

FDS controller 130, in various embodiments, is a set of software routines that are executable to facilitate the implementation of an FDS 135. When implementing FDS 135, in various embodiments, FDS controller 130 initially accesses data 125 as it may describe the desired state of FDS 135—e.g., how a user wants FDS 135 implemented. For example, data 125 may specify that an FDS 135 should be created in which a particular application 117 is instantiated on nodes within at least three different fault domains 110. Accordingly, in various embodiments, FDS controller 130 gathers information about resources 115 such as the storage capacity of each fault domain 110. In order to gather such information, FDS controller 130 may access data 125 as it may describe resources 115. In some cases, data 125 indicates where (e.g., in which fault domain 110) a given computer node or storage volume resides. As such, FDS controller 130 may group computer nodes and storage volumes by fault domain 110 and then may determine available resources 115 that correspond to each fault domain 110. FDS controller 130, in some embodiments, determines the current state of FDS 135 (e.g., how many fault domains 110 have been provisioned). Note that newly created FDSs 135 may not include any fault domains 110. In various instances, however, the desired state of an existing FDS 135 may be updated by a user and thus FDS controller 130 may determine the current state of that existing FDS 135.

Based on the desired state of FDS 135, the current state of FDS 135, and resources 115, in various embodiments, FDS controller 130 may provision one or more additional fault domains 110 to FDS 135. In some cases, FDS controller 130 may provision (i.e. assign) a fault domain 110 by instructing deployment system 120 on where to instantiate the particular application 117 associated with FDS 135. For example, the current state of FDS 135 may indicate that the particular application 117 is running on computer nodes in two different fault domains 110. The desired state of FDS 135, however, may indicate that the particular application 117 should be running on computer nodes in at least three different fault domains 110 and a total of 20 terabytes of storage should be available in FDS 135. Accordingly, in such an example, FDS controller 130 may instruct deployment system 120 to deploy the application 117 on particular computer nodes that reside in one or more of the remaining fault domains 110—e.g., each fault domain 110 may include 5 terabytes of storage and thus two fault domains 110 may be provisioned to FDS 130 for a total of four fault domains 110. By provisioning the additional fault domains 110 to FDS 135, FDS controller may reconcile the current state of FDS 135 with the desired state of FDS 135.

Implementing a system 100 that includes FDS controller 130 may be advantageous as FDS controller 130 may extend the functionality of deployment system 120 to allow for FDSs 135 to be created. By creating an FDS 135 and distributing an application 117 across multiple fault domains 110, application 117 may be protected from faults that occur in the underlying hardware—e.g., a power outage on a server rack. A particular implementation in which deployment system 120 is Kubernetes™ will now be described with respect to FIG. 2.

Figure 2:
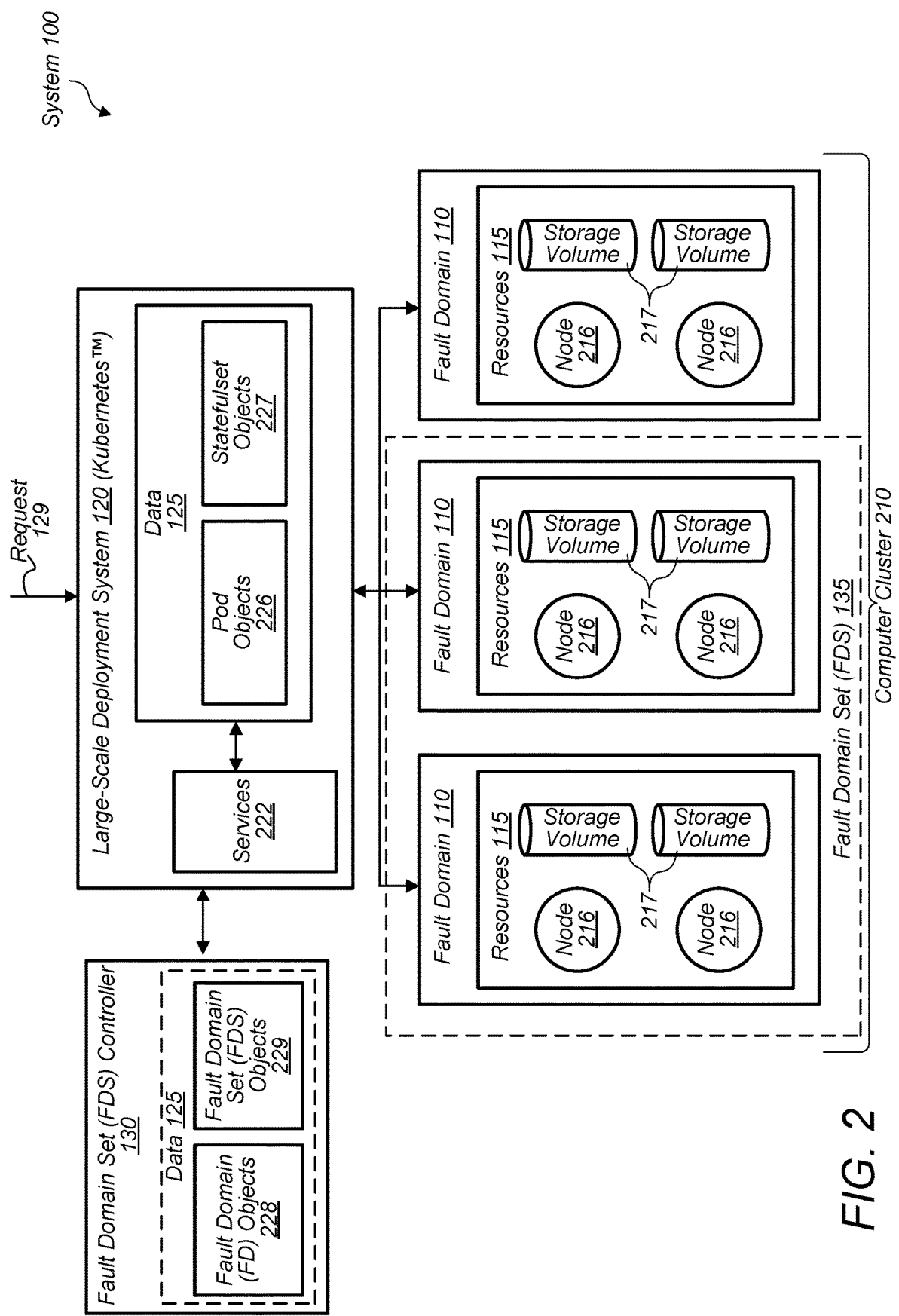
FIG. 2 is a block diagram illustrating exemplary elements of a system that includes a large-scale deployment system, according to some embodiments.

Turning now to FIG. 2, a block diagram of a system 100 in which Kubernetes™ serves as a deployment system 120 is shown. In the illustrated embodiment, system 100 includes a computer cluster 210, a large-scale deployment system 120 (Kubernetes™) and a fault domain set (FDS) controller 130. As shown, computer cluster 210 includes resources 115 having nodes 216 and storage volumes 217, and deployment system 120 includes data 125. Data 125 is further shown as including pod objects 226, statefulset objects 227, fault domain (FD) objects 228, and FDS objects 229. In various embodiments, FDS controller 130 may store portions of data 125 such as objects 228 and 229 in a local cache. In some embodiments, system 100 may be implemented differently than shown—e.g., a different deployment system 120 may be used instead of Kubernetes™.

As shown, a user may interact with large-scale deployment system 120 via request 129. In some embodiments, request 129 may be received by an application programming interface (API), not shown in FIG. 2, but which may be considered one of services 222. This interface allows a user to send various commands to system 120, for example to instantiate an application 117 on a node 216 within cluster 210. A user of system 100 may pass various values to system 120 as part of request 129, including configuration information that specifies desired characteristics of an FDS 135 for the application. As one example of such a characteristic, the configuration information may specify that the application be deployed on at least three different fault domains 110. As will be described further below, this paradigm advantageously extends the functionality of a large-scale deployment system 120 such as Kubernetes™ that is "unaware" of the fault-tolerant properties of resources 115 within computer cluster 210. In some embodiments, this functionality is found within FDS controller 130, FD objects 228, and FDS objects 229.

Kubernetes™ is an example of a large-scale deployment system, and is an open-source platform for automating the deployment, scaling, and management of containerized applications. These functions are facilitated via services 222, which may include a scheduler, a controller manager, and an application programming interface (API) server. In the Kubernetes™ context, the controller manager is responsible for running the controllers that interact with Kubernetes™. The scheduler is responsible for ensuring that pods have been assigned to a node 216. The API server exposes the Kubernetes™ API to users, controllers, and nodes 216 (e.g., the node agents running on nodes 216) so that they may communicate with Kubernetes™ and with each other. In some cases, requests 129 may be received from users via the API server.

Computer cluster 210, in various embodiments, is a collection of fault domains 110 and their resources 115 (e.g., nodes 216 and storage volumes 217) that are accessible to deployment system 120 (and FDS controller 130) for deploying software services. Nodes 216, in various embodiments, are physical or virtual computing systems (depending on the cluster 210) that can communicate with deployment system 120 via an API. Nodes 216, in some embodiments, run a node agent that handles the initialization of "pods" that have been assigned to its particular node by deployment system 120. In the Kubernetes™ context, a pod is a group of one or more containerized applications that are deployed on a single host system such as node 216. For certain services (e.g., storage services), pods may be bound to storage volumes 217 (e.g., local disk drives). After being assigned a pod by deployment system 120, the node agent may cause the containerized applications that are identified for the pod to be instantiated on its node (via a container program such as Docker™). The node agent, in various embodiments, periodically checks the instantiated applications to determine the overall health of a pod (e.g., determine whether any of the containerized applications have crashed). The node agent may report the health of a pod to deployment system 120. (Note that the node agent may be a sub-component of Kubernetes™).

To handle the deployment, scaling, and management of containerized applications, Kubernetes™ stores entities called objects. A Kubernetes™ object is a "record of intent" that describes a desired state for computer cluster 210. For example, an object may represent a user's request to instantiate a particular application 117 on some node 216. In the Kubernetes™ context, an object specifies two fields that are usable for implementing what the object represents (e.g., a user request to instantiate an application 117): an object specification and an object status. The object specification may specify characteristics that define a desired state—e.g., a storage service such as Ceph™ should be running on some node 216 in cluster 210. The object status may define an actual state—e.g., Ceph™ is not running on any nodes 216. In some embodiments, the system (e.g., Kubernetes™ or FDS controller 130) responsible for processing an object attempts to reconcile the current state defined by an object to the desired state defined by that object. Returning to the examples above, a deployment system 120 such as Kubernetes™ may instantiate Ceph™ on a node 216, moving the current state to the desired state. The system responsible for processing an object may ensure that the object status accurately reflects the actual state of computer cluster 210.

In one embodiment, Kubernetes™ can process two object types: pod objects 226 and statefulset objects 227. A pod object 226 represents a pod and, accordingly, specifies one or more applications 117 and storage volumes 217 accessible to those applications for storing data. Processing a pod object 226 may result in the one or more applications 117 being instantiated on some node 216 within computer cluster 210. As an example, when processing a pod object 226 that specifies a storage service, a deployment system 120 such as Kubernetes™ may select some node 216 and instruct its node agent to communicate with a container program such as Docker™ in order to instantiate the storage service on that node 216. A "statefulset" object 227, in Kubernetes™ terminology, corresponds to a collection of one or more pod objects 226 along with storage volumes 217 associated with those objects. A statefulset object 227 may represent an update domain, which may be used to provide an update to some subset of the pods that are running within computer cluster 210. The information (e.g., specifications) defined by pod objects 226 and statefulset objects 227 may be provided by users and/or an FDS controller 130 envisioned as an extension to deployment system 120.

Figure 3:
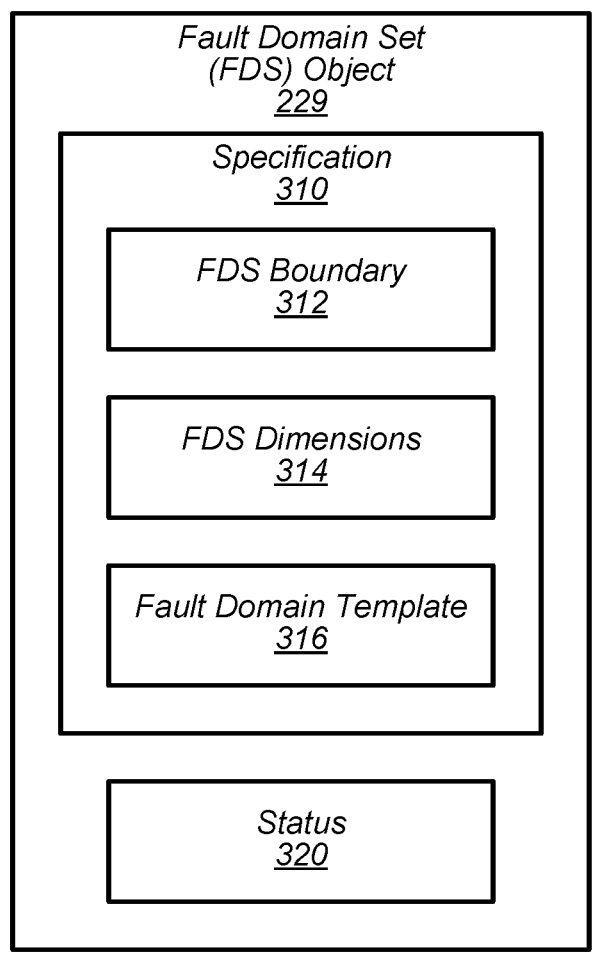
FIG. 3 is a block diagram illustrating example elements of a specification and a status for a fault domain set, according to some embodiments.

The inventors have recognized that, in addition to objects 226 and 227, the use of two additional types of objects (fault domain objects 228 and fault domain set objects 229—both described further with reference to FIG. 3), along with FDS controller 130, can advantageously allow an application to be deployed on cluster 210 in a more fault-tolerant manner.

FDS controller 130, in various embodiments, is a set of software routines that has access to information about the fault-tolerance of resources 115 within computer cluster 210 (e.g., the different fault domains 110) and is executable to facilitate the deployment of an application in a fault-tolerant manner (e.g., by maintaining and updating FDS 135). Accordingly, FDS controller 130 may process FD objects 228 and FDS objects 229, and ensure that the criteria that is defined in their specifications is met. An FD object 228, in various embodiments, represents a fault domain 110 and, in some instances, corresponds to a collection of one or more statefulset objects 227. In other instances, FD object 228 may correspond directly to a collection of one or more pod objects 226 and not statefulset objects 227—i.e., a fault domain 110 may not include update domains. An FDS object 229, in various embodiments, represents an FDS 135 and corresponds to a collection of one or more FD objects 228 that share common properties (e.g., a pod template, a service name, etc.), but represent disjointed fault domains 110.

In various embodiments, FDS controller 130 performs certain control loops in order to reconcile the current state of computer cluster 210 with the desired states defined within FDS objects 229 and FD objects 228. In particular, FDS controller 130 may perform two control loops: one for FDS objects 229 and another for FD objects 228. When processing an FDS object 229, in some embodiments, FDS controller 130 provisions one or more fault domains 110 to an FDS 135 (associated with that FDS object 229). In order to provision a fault domain 110, FDS controller 130 may create (or facilitate the creation of) an FD object 228. This FD object 228 may specify an application 117 and a particular fault domain 110 on which to deploy instances of that application 117. When processing an FD object 228, in various embodiments, FDS controller 130 instructs deployment system 120 to instantiate an application 117 on one or more nodes 216 of the particular fault domain 110 specified by that FD object 228. FDS controller 130 may instruct deployment system 120 by creating (or facilitating the creation of) one or more statefulset objects 227. These statefulset objects 227 may specify the particular fault domain 110 of that FD object 228 such that deployment system 120 uses resources 115 belonging to that fault domain 110. Accordingly, in various embodiments, processing an object to move from the current state of computer cluster 210 to the desired state defined in the object may involve provisioning one or more lower-order objects. The hierarchical relationships between objects are described in greater detail below with respect to FIG. 4 and the particulars of the two control loops are described in greater detail below with respect to FIG. 5.

In implementations in which Kubernetes™ serves as deployment system 120, FDS controller 130 extends the functionality of a large-scale deployment system such as Kubernetes™ by being able to create FDSs 135. FDS controller 130 may do this by processing two new object types: FD objects 228 and FDS objects 229—e.g., reconciling the current state of computer cluster 210 with the desired states specified by these objects. In order to move the current state to the desired state, FDS controller 130 may use the object specification and the object status defined in FDS objects 229. Accordingly, the object specification and the object status of FDS objects 229 will now be discussed with respect to FIG. 3.

Turning now to FIG. 3, a block diagram of an FDS object 229 is shown. In the illustrated embodiments, FDS object 229 defines a specification 310 and a status 320. As shown, specification 310 includes an FDS boundary 312, FDS dimensions 314, and a fault domain template 316. FDS object 229 may be implemented differently than shown—e.g., FDS object 229 may include additional information such as the owner references discussed with respect to FIG. 4. Broadly speaking, an FDS object 229 describes desired properties of an FDS 135 for an application. This information is used by FDS controller 130 as described further below. Additionally, FDS object 229 may describe a template for creating objects such as FD objects 228.

FDS boundary 312, in various embodiments, defines the scope of the fault domains 110 that are provisioned to an FDS 135. In particular, as mentioned above, fault domains 110 may be a collection of resources 115. Accordingly, a hierarchical system may exist in which different levels in the hierarchy correspond to different scopes or ways for grouping resources 115. For example, a data processing center and a server rack may be considered different scopes of fault domains. A higher-order fault domain 110 (e.g., a data processing center) may include multiple distinct lower-order fault domains 110 (e.g., server racks). In various embodiments, FDS boundary 312 specifies a level in the hierarchy where all pods and volumes 217 of a fault domain 110 will be guaranteed to be provisioned. For example, if FDS boundary 312 is set to data processing center, then each fault domain 110 in FDS 135 may correspond to a different data processing center; however, if FDS boundary 312 is set to server rack, then each fault domain 110 in FDS 135 may correspond to a different server rack. In some embodiments, if a higher-order fault domain 110 includes lower-order fault domains 110 and if FDS boundary 312 is set to the higher-order fault domain 110, then each update domain in a fault domain 110 may correspond to a distinct lower-order fault domain 110. For example, when FDS boundary 312 is set to data processing center, then fault domain 110 may correspond to data processing centers and the update domains in that fault domain 110 may correspond to individual server racks.

FDS dimensions 314, in various embodiments, define desired properties for an FDS 135. These properties may include the minimum number of fault domains 110 that must be provisioned to an FDS 135, the aggregate storage capacity of an FDS 135, and the bounds for the storage capacity served from a single fault domain 110. As explained earlier, pods may be bound to storage volumes 217 in cluster 210. Accordingly, in some embodiments, the aggregate storage capacity of an FDS 135 is defined as the summation of the storage capacity across all pods provisioned within that FDS 135. In some cases, the actual amount of storage capacity may be higher than the storage capacity defined within FDS dimensions 314. In some embodiments, the bounds for the storage capacity served from a single fault domain 110 include: a lower bound defining the minimum amount of storage capacity that must be available in a fault domain 110 for it to be considered a viable component for an FDS 135 and an upper bound that defines the maximum amount of storage capacity that is allowed to be served from a fault domain 110. For example, a user may wish to distribute a storage service across multiple fault domains 110, but may not wish to have too much data being served by the storage service from a single fault domain 110. In some embodiments, FDS dimensions 314 define explicit properties that control the exact number of pods that must be present (or deployed) in each fault domain 110 and the exact number of fault domains 110 that must be provisioned to FDS 135.

Fault domain template 316, in various embodiments, defines diverse properties for the entities (e.g., nodes 216, volumes 217, pods, update domains, etc.) in each fault domain 110. As explained earlier, update domains may be used to progressively update different instantiations of an application 117 (e.g., groups of pods). For example, if a storage service is running on ten nodes, then the ten nodes may be divided into five update domains. When an update to the storage service is available, then it may be applied to instantiations running in a first update domain before being applied to instantiations running in a second update domain. In some embodiments, template 316 specifies a maximum size for an update domain that is provisioned to a fault domain 110. This maximum size may control the number of pods that are allowed to be deployed within (or provisioned for) an update domain so that FDS controller 130 may guarantee that at most that number of pods are undergoing an update concurrently. In some embodiments, template 316 defines the specification for pod objects 228. This specification may define, among other things, application images (e.g., a disk image file), environment variables, storage volumes 114, types of storage (e.g., solid state drives), etc. In some embodiments, template 316 defines the storage volumes 114 that applications 117 (instantiated for a pod) are allowed to access and use for storage—e.g., template 316 may specify Kubernetes™ volume claims and matching volume mounts.

Status 320, in various embodiments, defines a point-in-time snapshot of the status of an FDS 135. In some embodiments, status 320 defines the number of fault domains 110 provisioned for an FDS 135. Status 320 may further define the number of fault domains 110 that are ready—e.g., fully provisioned and all pods in a fault domain 110 have a ready condition. As mentioned earlier, each node 216 may run a node agent that checks the health of applications 117 running on that node. Accordingly, when a given application 117 has been instantiated on a node 216, the node agent may notify deployment system 120, which may notify FDS controller 130 so that it may update status 320. For example, for a storage service, an instantiation of that service may be ready when it can process requests to read from and write to volumes 217.

In a similar fashion to an FDS object 229, in various embodiments, the status of a FD object 228 specifies the number of update domains that have been provisioned for the fault domain 110. This status may also indicate the number of provisioned update domains that are ready. In various embodiments, the status of an FD object 228 defines an indication of the overall state in provisioning the fault domain 110. This indication may be used by FDS controller 130 to determine if that fault domain 110 has been completely provisioned.

Specification 310 and status 320 may be used by FDS controller 130 to determine the desired state (e.g., specification 310) of an FDS 135 and the current state (e.g., status 320) of that FDS 135. Accordingly, FDS controller 130, in various embodiments, uses this information to reconcile an FDS 135's current state with its desired state. In some cases, however, additional information may be used. This information will now be discussed with respect to FIG. 4.

Figure 4:
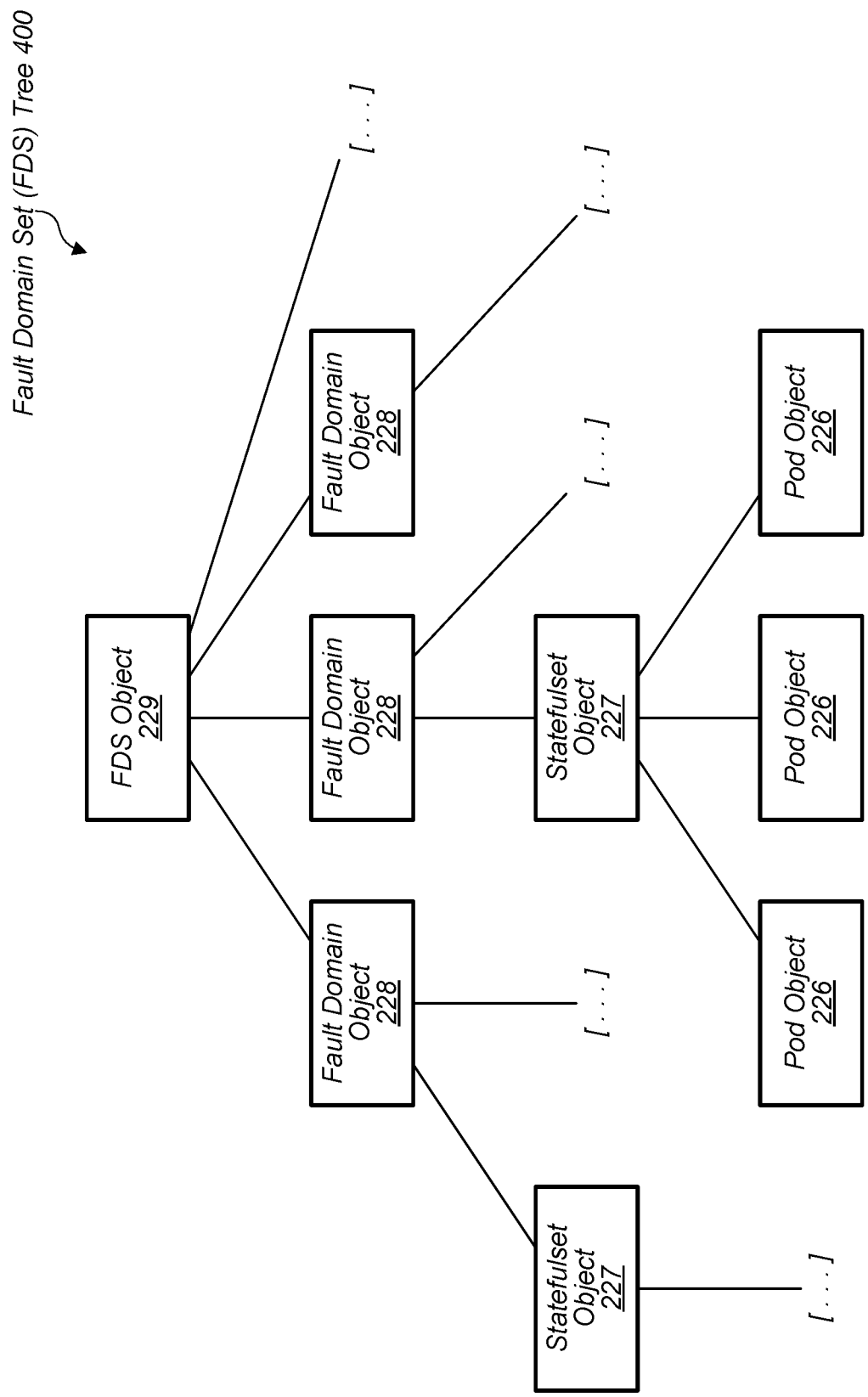
FIG. 4 is a block diagram illustrating example elements of relationships between fault domain sets and fault domains, according to some embodiments.

Turning now to FIG. 4, a block diagram of a fault domain set tree 400 is shown. In the illustrated embodiment, FDS tree 400 includes an FDS object 229, various FD objects 228, various statefulset objects 227, and various pod objects 226. As depicted, pod objects 226 branch from statefulset objects 227, which further branch from FD objects 228. Also, as shown, FD objects 228 branch from a root FDS object 229. In some embodiments, tree 400 may be implemented differently than shown—e.g., tree 400 may not include statefulset objects 227 and thus pod objects 226 may branch from FD objects 228.

As described earlier, Kubernetes™ allows a user to define pod objects 226 and statefulset objects 227 that respectively specify pods and update domains. Embodiments of the present disclosure allow for a user to further specify FD objects 228 (in some cases, indirectly via FDS objects 229) and FDS objects 229. As shown in FDS tree 400, particular instantiations of these objects may form a hierarchy. This arrangement may allow for FDS controller 130 to determine which fault domains 110 have been provisioned to a given FDS 135 (e.g., by enumerating over FD objects 228).

In various embodiments, a parent-child relationship exists between objects handled by system 100. Accordingly, FDS controller 130 may use these relationships to determine which entities (e.g., fault domains 110, update domains, etc.) are children of a particular entity (e.g., FDS 135, fault domains 110, etc.). In particular, in various embodiments, each object of tree 400 (except for FDS object 229 in various cases) includes an owner reference that identifies the object that owns it. As an example, a statefulset object 227 may have an owner reference that specifies the unique identifier (UID) of an FD object 228. In various embodiments, FDS controller 130 uses these owner references to determine which fault domains 110 have already been provisioned for an FDS 135 when attempting to reconcile the current state of that FDS 135 with the desired state of that FDS 135.

In various embodiments, a given object in tree 400 may become orphaned when its parent is deleted. For example, an FDS object 229 may be deleted, causing any FD objects 228 that referenced that FDS object 229 to reference a non-existent object. Accordingly, in some embodiments, FDS controller 130 may determine whether a given object in tree 400 has become orphaned by checking if its owner exists. If an object has become orphaned, in various embodiments, the resources 115 corresponding to that object become available again for provisioning. Accordingly, when determining available resources 115 in compute cluster 210, FDS controller 130 may determine if any orphaned objects exists so that it can use the resources of those objects. Said differently, if an FDS 135 is deleted (or removed), then FDS controller 130 may use the fault domain 110 (and their resources 115) that were a part of that original FDS 135 for another FDS 135.

In various embodiments, deployment system 120 may use the objects in tree 400 to construct a topology of an FDS 135. This topology may provide information about the various entities (e.g., pods, update domains, fault domains 110, etc.) and their connections to each other in a format readable by users of system 100. Accordingly, deployment system 120, in various embodiments, displays the topology to users of system 100.

The parent-child relationship between objects may be used by FDS controller 130 to determine the current state of an entity. Processes for moving an FDS 135 and its fault domains 110 from a current state to a desired state will now be discussed with respect to FIG. 5.

Figure 5:
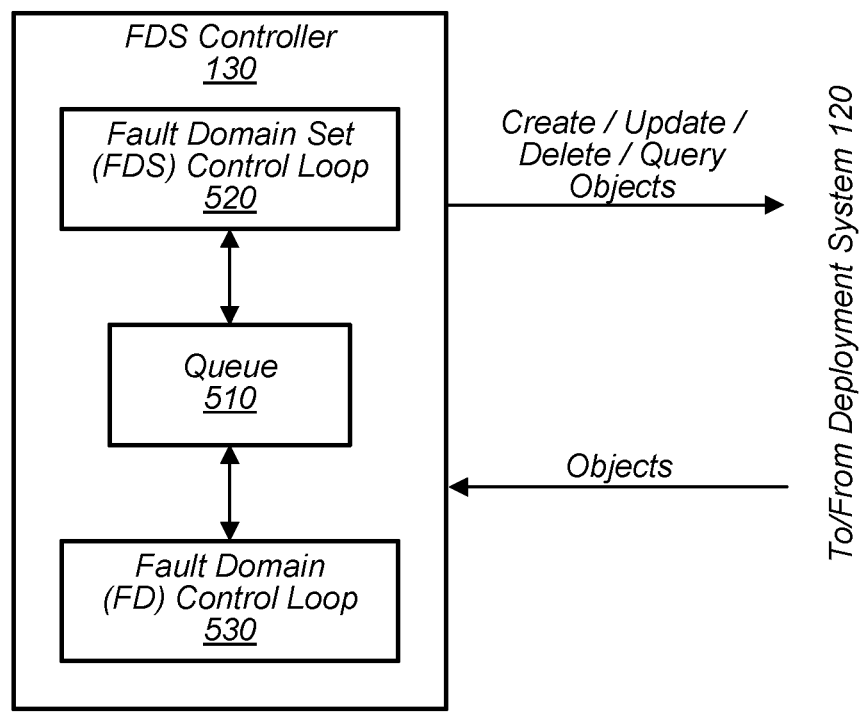
FIG. 5 is a block diagram illustrating example elements of a fault domain set controller that provisions fault domain sets, according to some embodiments.

Turning now to FIG. 5 a block diagram of an FDS controller 130 is shown. In the illustrated embodiments, FDS controller 130 includes a queue 510, a fault domain set (FDS) control loop 520, and a fault domain (FD) control loop 530. In some embodiments, FDS controller 130 may be implemented differently than shown—e.g., FDS controller 130 may include a local cache for storing copies of the objects found in data 125.

As mentioned previously, Kubernetes™ allows a user to define objects 226 and objects 227 that respectively specify pods and update domains. Embodiments of the present disclosure allow for a user to further specify FD objects 228 (in some cases, indirectly via FDS objects 229) and FDS objects 229. These types of objects may, in a particular instance, specify a hierarchy such as that depicted in FIG. 4. In some embodiments, FDS controller 130 includes a control loop dedicated to each of objects 228 and 229 (this may be needed when, as in some implementations, a control loop is needed for each type of object in tree 400). When processing an object, one or more lower-order objects in the hierarchy may be created. As an example, processing FDS object 229 may result in one or more FD objects 228, which, when processed, may result in one or more statefulset objects 227. The control loops 520 and 530 of FDS controller 130 may thus interact with the routines of large-scale deployment system 120 in order to have those routines process objects (e.g., objects 227) that result from control loops 520 and 530.

Queue 510, in various embodiments, is populated with the identifiers of objects (e.g., FD objects 228, FDS objects 229). These identifiers may be inserted into queue 510 when certain events occur—the events may indicate that an entity's (e.g., FDS 135) current state is different than its desired state. In various embodiments, the following events cause an identifier of an FDS object 229 to be inserted into queue 510: the creation, modification, or deletion of an FDS object 229 (e.g., FDS object 229's specification is updated); or the creation, modification, or deletion of an FD object 228. In various embodiments, the following events cause an identifier of an FD object 228 to be inserted into queue 510: the creation, modification, or deletion of an FD object 228; or the creation, modification, or deletion of a statefulset object 227. In some embodiments, FDS controller 130's cache is re-synced with data 125, which may cause identifiers to be inserted into queue 510. In some embodiments, the identifiers stored within queue 510 are retrieved by worker routines that implement loops 520 and 530. After retrieving an identifier from queue 510, a worker routine may retrieve the corresponding object from FDS controller 130's local cache or data 125 of deployment system 120.

FDS control loop 520, in various embodiments, is performed on an FDS object 229 to reconcile the current state of an FDS 135 with the desired state of that FDS 135. When performing control loop 520, in some embodiments, FDS controller 130 determines fault domains 110 and their resources 115 (e.g., nodes 216 and volumes 217) that are available for provisioning to an FDS 135. In particular, data 125 may specify additional information about nodes 216 and volumes 217. For a node 216, this information may specify the CPU, memory, and maximum number of pods that can be scheduled for that node. For volumes 217, this information may specify the storage capacity of each volume 217 along with what volumes 217 are accessible to what pods. In various embodiments, nodes 216 and volumes 217 are each associated with a label (specified in data 125) that identifies the fault domain 110 to which that node 216 or volume 217 belongs. These labels may be provided by a user of system 100 or by FDS controller 130. Accordingly, FDS controller 130 may examine these labels in order to group resources 115 by fault domain 110. Once grouped, FDS controller 130 may then determine which resources 115 belong to which fault domain 110. That is, FDS controller 130 may know the resources 115 that are available for a given fault domain 110. In various embodiments, FDS controller 130 further determines if any orphaned objects exist whose resources 115 are also available.

In some embodiments, FDS controller 130 determines the current state of FDS 135 (corresponding to the retrieved FDS object 229). FDS controller 130 may determine the current state of FDS 135 based on the particular fault domain 110 (and their resources 115) that have already been provisioned to FDS 135. In some embodiments, FDS controller 130 determines how many fault domains 110 have already been provisioned by examining the FDS object 229's status 320. In some embodiments, FDS controller 130 determines which fault domains 110 have been provisioned to FDS 135 by examining the owner reference associated with each FD object 228 specified in data 125. Based on the owner references and its knowledge about which resources 115 belong to which particular fault domain 110, in various embodiments, FDS controller 130 determines the number of fault domains 110 that have been provisioned to FDS 135 and the aggregate storage capacity of FDS 135.

Based on the available resources, the current state of FDS 135, and the desired state for FDS 135, in some embodiments, FDS controller 130 provisions one or more additional fault domains 110 to FDS 135. As explained earlier, this may involve creating one or more FD objects 228 that each reference a particular fault domain 110 and its resources 115 (e.g., nodes 216). Each provisioned FD object 228 may specify a desired amount of storage that should be served from the corresponding fault domain 110. For example, FDS object 229's specification 310 may specify an aggregate storage capacity of 10 terabytes and a minimum of four fault domains 110. Accordingly, if the current state of FDS 135 is two fault domains 110 and a total storage of four terabytes, then FDS controller 130 may provision three more fault domains 110 that each have two terabytes—satisfying the desired state. After the one or more fault domains 110 have been provisioned, in various embodiments, FDS controller 130 updates status 320 of the retrieved FDS object 229 to indicate that one or more fault domains 110 have been provisioned.

FD control loop 530, in various embodiments, is performed on an FD object 228 to reconcile the current state of a fault domain 110 with the desired state of that fault domain 110. When performing FD control loop 530, in some embodiments, FDS controller 130 determines resources 115 that belong to the relevant fault domain 110. In particular, FDS controller 130 may examine the labels (discussed above) in order to group resources 115 by fault domain 110. FDS controller 130 may then determine which resources 115 belong to the relevant fault domain 110.

In some embodiments, FDS controller 130 determines the current state of the fault domain 110 (corresponding to the retrieved FD object 228). FDS controller 130 may determine the current state of fault domain 110 based on the particular update domains (and their pods) that have already been provisioned to fault domain 110. In some embodiments, FDS controller 130 determines how many update domains have already been provisioned by examining the FD object 228's status. In some embodiments, FDS controller 130 determines which update domains have been provisioned to fault domain 110 by examining the owner reference associated with each statefulset object 227 specified in data 125.

Based on the available resources, the current state of fault domain 110, and the desired state for fault domain 110, in some embodiments, FDS controller 130 provisions one or more additional update domains to fault domain 110. As explained earlier, this may involve creating one or more statefulset objects 227 that each reference the relevant fault domain 110. Each provisioned statefulset object 227 may specify a maximum number of pods that are allowed to be provisioned to that corresponding update domain. After the one or more update domains have been provisioned, in some embodiments, FDS controller 130 updates the status of the retrieved FD object 228 to indicate that one or more update domains have been provisioned.

As explained earlier, deployment system 120 may process a statefulset object 227 by provisioning one or more pod objects 226 that correspond to the fault domain 110 that is referenced by that statefulset object 227. Deployment system 120 may then process a pod object 226 by assigning a pod to one of the nodes 216 within the relevant fault domain 110. Once a pod has been assigned to a node 216, the node agent running on that node 216 may instantiate application 117 (specified originally in template 316 of FDS object 229) on that node 216. Accordingly, processing FDS objects 229 may result in the creation of FDS 135 and the dissemination of application 117 (e.g., a storage service) across multiple fault domains 110 in that FDS 135.

Figure 6:
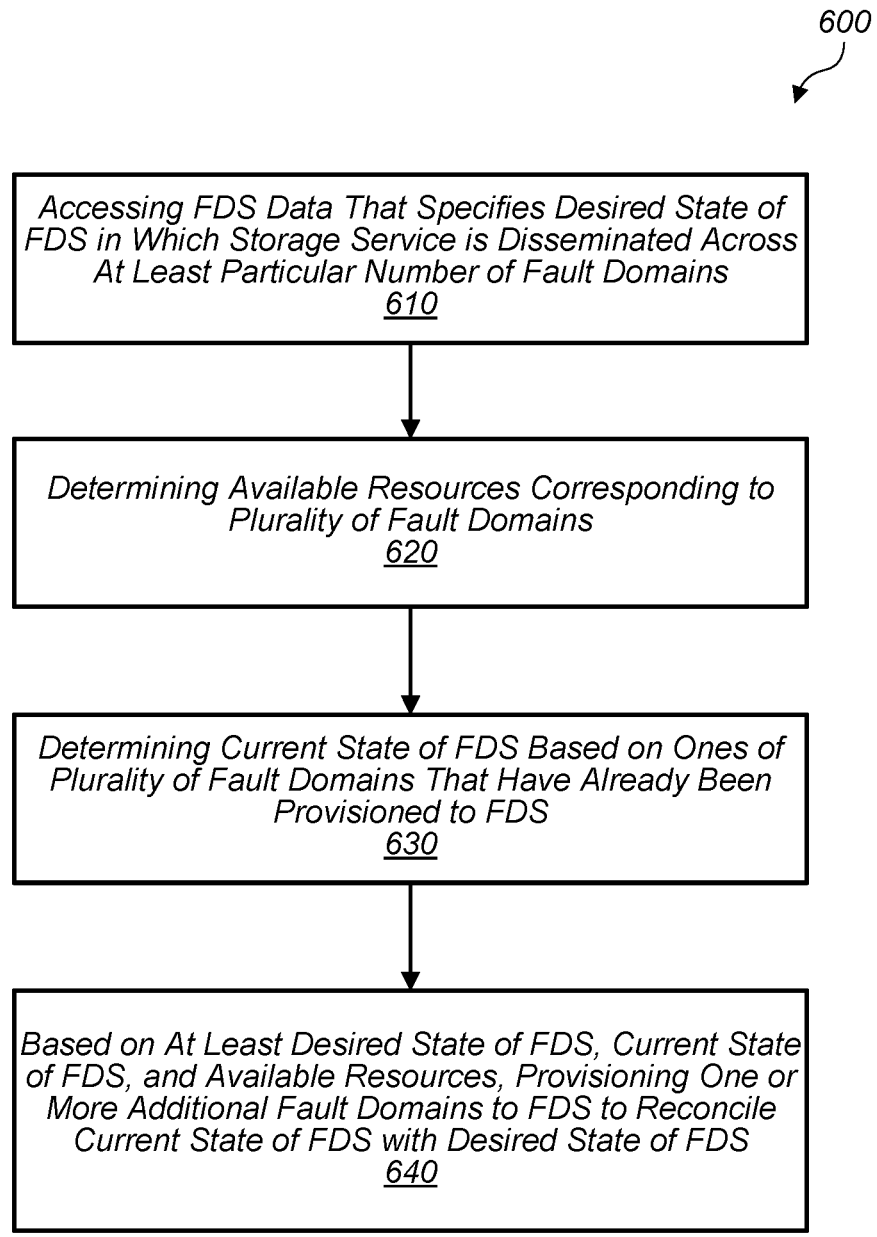
FIG. 6-8 are flow diagrams illustrating example methods relating to provisioning and managing of a fault domain set, according to some embodiments.

Turning now to FIG. 6, a flow diagram of a method 600 is shown. Method 600 is one embodiment of a method performed by a computer system (e.g., system 100) in order to provision and manage a fault domain set (e.g., FDS 135). Method 600 may be performed to implement a fault domain set for disseminating a storage service (e.g., application 117) across a plurality of fault domains (e.g., fault domains 110) within the computer system. In various embodiments, method 600 is carried out by executing program instructions that implement FDS controller 130. In some embodiments, method 600 includes additional steps such as updating the status (e.g., status 320) of a fault domain set.

Method 600 begins in step 610 with a computer system accessing FDS data (e.g., FDS object 229 defined in data 125) that specifies a desired state (e.g., specification 310) of the FDS in which the storage service is disseminated across at least a particular number of fault domains (e.g., specified in FDS dimensions 314). The FDS data may also specify, for the desired state of the FDS, a minimum aggregate storage capacity for the FDS.

In step 620, the computer system determines available resources (e.g., resources 115) corresponding to the plurality of fault domains. The available resources may be used for attaining the desired state. In various embodiments, the available resources include computer nodes (e.g., nodes 216) and storage (e.g., volumes 217) that are available for implementing the storage service. One of the plurality of fault domains may include a first amount of storage capacity while a second one of the plurality of fault domains may include a second, different amount of storage capacity. Ones of the available resources may be associated with an indication (e.g., a label defined in data 125) that specifies a fault domain to which that available resource belongs. In various embodiments, the computer system determines the available resources by determining, for a given fault domain, particular ones of the available resources that belong to that fault domain based on indications corresponding to the particular available resources specifying that fault domain.

In step 630, the computer system determines a current state (e.g., status 320) of the FDS based on ones of the plurality of fault domains that have already been provisioned to the FDS. The FDS data may specify a status (e.g., status 320) of the FDS that is usable to determine the current state of the FDS and indicates a number of fault domains that have already been provisioned to the FDS.

In step 640, based on at least the desired state of the FDS, the current state of the FDS, and the available resources, the computer system provisions one or more additional fault domains to the FDS to reconcile the current state of the FDS with the desired state of the FDS. The one or more additional fault domains may facilitate the implementation of the storage service. The computer system may modify the number indicated in the status of the FDS to indicate that the one or more additional fault domains have been provisioned to the FDS.

To provision a fault domain, in various embodiments, the computer system accesses fault domain data (e.g., FD object 228 defined in data 125) associated with the fault domain that specifies a desired state of the fault domain in which at least a particular amount of storage is served from the fault domain for the storage service. The computer system may then determine available resources corresponding to the fault domain. The computer system, in some embodiments, determines resources corresponding to the fault domain that have already been provisioned for the storage service. Based on at least the desired state of the fault domain, the already provisioned resources, and the available resources corresponding to the fault domain, the computer system provisions one or more of the available resources (e.g., by creating statefulset objects 227) for the storage service.

Figure 7:
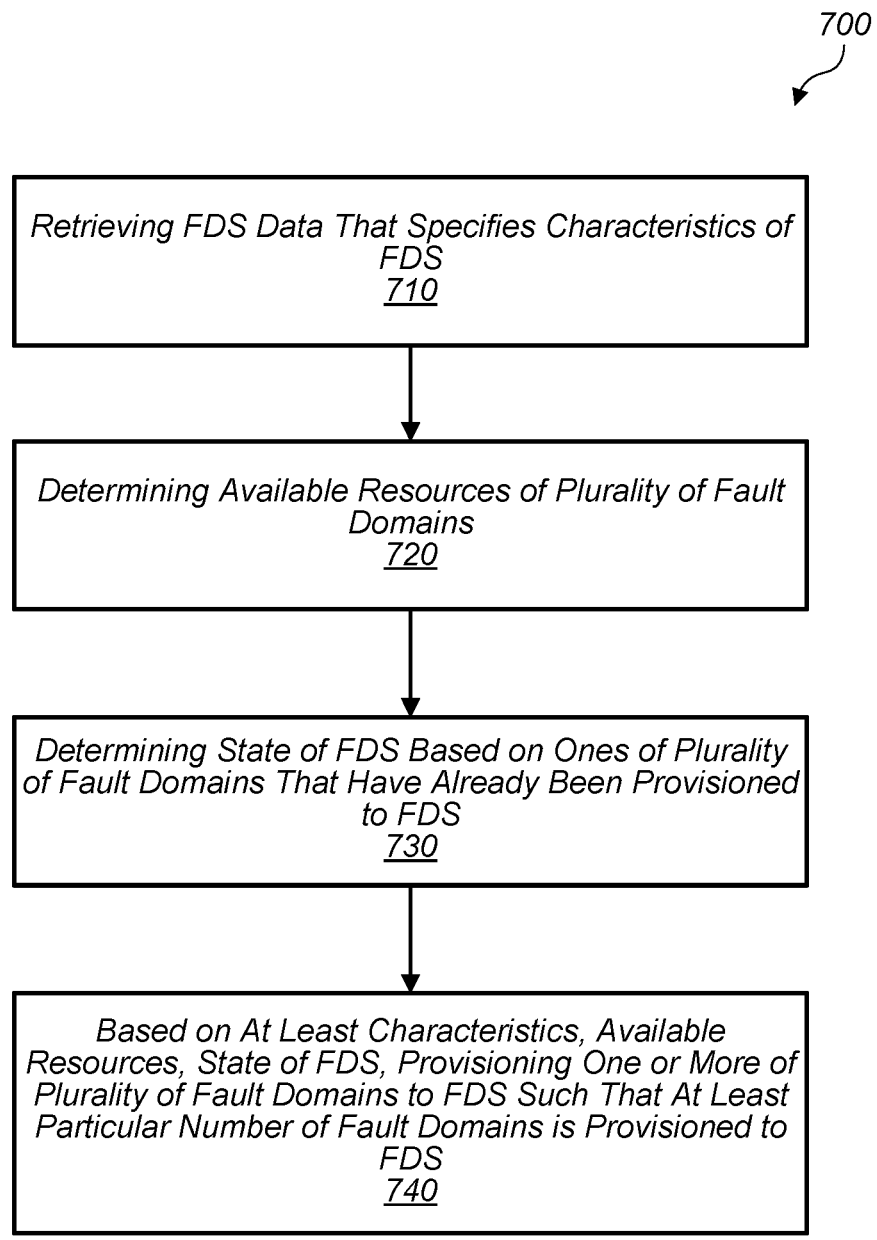

Turning now to FIG. 7, a flow diagram of a method 700 is shown. Method 700 is one embodiment of a method performed by a computer system (e.g., system running FDS controller 130) within a data processing center (e.g., system 100) in order to provision and manage a fault domain set (e.g., FDS 135). Method 700 may be performed to implement a fault domain set (FDS) for distributing instances of an application (e.g., application 117) across a plurality of fault domains (e.g., fault domains 110) within the data processing center. Each fault domain may correspond to distinct sets of one or more computer systems (e.g., nodes 216). Method 700 may include additional steps such as the computer system causing information describing a topology of the FDS to be displayed to a user of the data processing center—the information may indicate fault domains that have been provisioned to the FDS.

Method 700 begins in step 710 with a computer system retrieving FDS data (e.g., FDS object 229) that specifies characteristics (e.g., specification 310) of the FDS. One of the characteristics may indicate that the instances of the application should be distributed across at least a particular number of fault domains. In some embodiments, the FDS data specifies a minimum and a maximum amount of resources to be served from a single fault domain.

In step 720, the computer system determines available resources (e.g., resources 115) of the plurality of fault domains. In step 730, the computer system determines a state of the FDS based on ones of the plurality of fault domains that have already been provisioned to the FDS. The computer system may associate a given provisioned fault domain, with an identifier (e.g., an owner reference) that indicates that the given provisioned fault domain belongs to the FDS. In some embodiments, a particular one of the plurality of fault domains is associated with an identifier indicating that the particular fault domain belongs to a different FDS. Thus, when determining available resources, the computer system may determine whether the different FDS referenced by the identifier has been deleted (e.g., the particular FDS object 229 has been deleted). In response to determining that the different FDS has been deleted, the computer system may determine that resources of the particular fault domain are available for provisioning to the FDS.

In step 740, based on at least the characteristics, the available resources, the state of the FDS, the computer system provisions one or more of the plurality of fault domains to the FDS such that at least the particular number of fault domains is provisioned to the FDS. To provision a fault domain, in various embodiments, the computer system retrieves fault domain data (e.g., an FD object 228) that specifies characteristics of the fault domain that include that at least a particular amount of resources of the fault domain should be provisioned to the FDS. The computer system may then determine available resources of the fault domain. In some embodiments, based on at least the characteristics of the fault domain and the available resources of the fault domain, the computer system provisions at least the particular amount of resources (e.g., by creating statefulset objects 227) from the available resources to the FDS.

Figure 8:
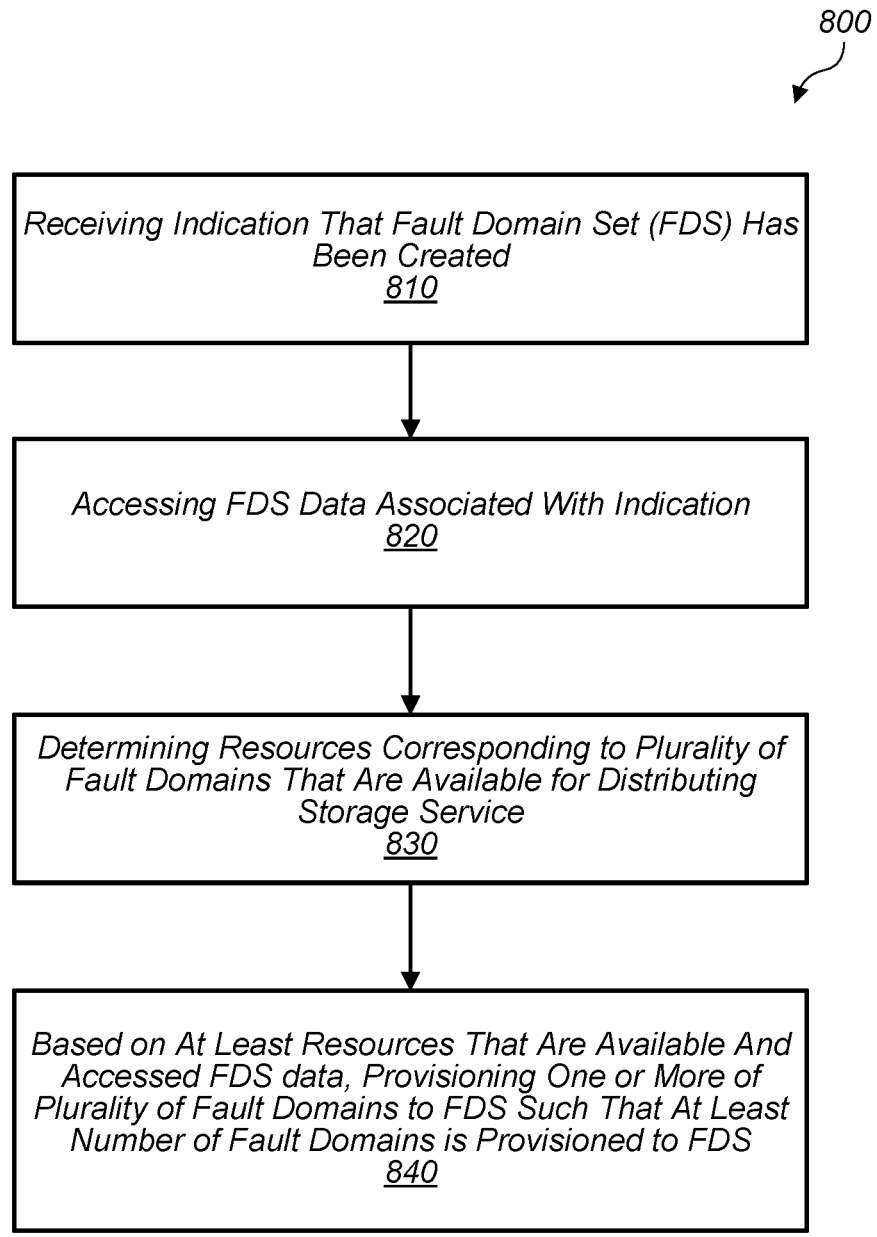

Turning now to FIG. 8, a flow diagram of a method 800 is shown. Method 800 is one embodiment of a method performed by a computer system (e.g., a system running FDS controller 130) within a data processing center (e.g., system 100) in order to provision and manage a fault domain set (e.g., FDS 135). Method 800 may include additional steps.

Method 800 begins in step 810 with a computer system receiving an indication (e.g., an identifier stored in queue 510) that a fault domain set (FDS) has been created (e.g., an FDS object 229 has been created). The indication may be associated with FDS data (e.g., an FDS object 229) that specifies that a storage service is to be disseminated across at least a number of a plurality of fault domains within the data processing center. Each of the plurality of fault domains may correspond to a set of computer systems in the data processing center where the set of computer systems, for a given fault domain, share a common point of failure.

In step 820, the computer system accesses the FDS data associated with the indication. The FDS data may specify storage volumes (e.g., volumes 217 identified in storage claims) in the available resources that are accessible by the storage service for storing data. In step 830, the computer system determines resources (e.g., resources 115) that correspond to the plurality of fault domains that are available for distributing the storage service.

In step 840, based on at least the resources that are available and the accessed FDS data, the computer system provisions one or more of the plurality of fault domains to the FDS such that the at least a number of fault domains is provisioned to the FDS. In some embodiments, the computer system determines a set of fault domains that have already been provisioned to the FDS. Accordingly, the provisioning of the one or more fault domains may be based on the set of already provisioned fault domains. When provisioning a fault domain, in various embodiments, the computer system assigns one or more update domains (e.g., provisions one or more statefuleset objects 227) to the fault domain. (Note that, in some cases, an update domain might include components in different fault domains). A given one of the assigned update domain may specify instances of the storage service (e.g., may correspond to a set of pod objects 226 that get assigned to nodes 216) that are to be updated as a group (e.g., the update is propagated to the pods in the update domain). These assigned update domains for the fault domain may allow an update to the storage service to be applied without compromising availability of the storage service. To provision a fault domain, the computer system accesses fault domain data (e.g., an FD object 228) associated with the fault domain. The fault domain data may specify a maximum number of allowable instances of the storage service within an update domain. In some embodiments, the computer system determines available resources corresponding to the fault domain. The computer system may also determine a number of instances of the storage service to be instantiated within the fault domain. Based on at least the available resources corresponding to the fault domain, the number of instances of the storage service to be instantiated, and the maximum number of allowable instances, the computer system may assign one or more update domains (e.g., by creating statefulset objects 227) to the fault domain.

Exemplary Computer System

Figure 9:
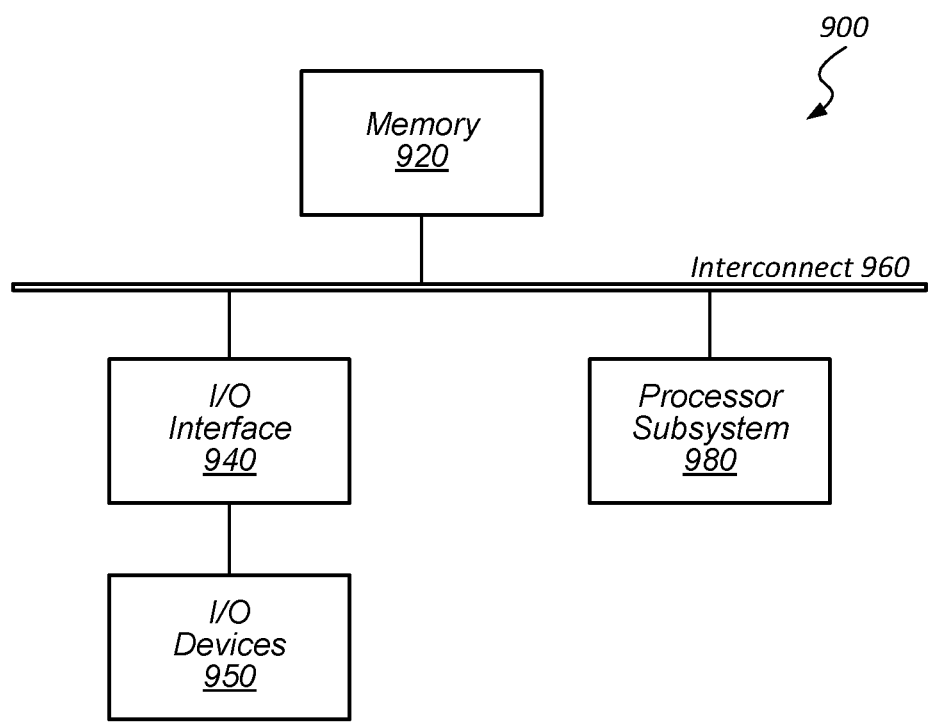
FIG. 9 is a block diagram illustrating an example computer system, according to some embodiments.

Turning now to FIG. 9, a block diagram of an exemplary computer system 900, which may implement system 100, deployment system 120, and/or FDS controller 130, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, FDS controller 130 described above may include (or be included within) system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising providing, by a computer system, a deployment service involving a computer cluster that comprises a plurality of fault domains having respective hardware resources;
   provisioning, by the computer system, one or more pods to one or more of the plurality of fault domains, wherein the one or more pods implement a service;
   accessing, by the computer system, a fault domain set object comprising a value indicating that a new pod is to be interleaved with the one or more pods across the plurality of fault domains;
   determining, by the computer system, a current state of the computer cluster by iterating through a plurality of fault domain states, wherein a fault domain state is indicative of which pods are provisioned in a corresponding fault domain; and
   based on at least the current state of the computer cluster and the value of the fault domain set object, the computer system provisioning the new pod to one or more of the plurality of fault domains such that the computer cluster achieves the value of the fault domain set object for interleaving pods across the plurality of fault domains.

2. The method of claim 1, wherein the provisioning of the new pod is performed in accordance with deployment information that specifies a set of properties that control how many pods can be provisioned to a fault domain.

3. The method of claim 1, wherein the provisioning of the new pod is performed in accordance with deployment information that specifies a set of properties that define a minimum number of fault domains to use to provision the service.

4. The method of claim 1, wherein the provisioning of the new pod is performed in accordance with deployment information that specifies a set of properties that control how many pods can be provisioned to a computer node that is included in a fault domain.

5. The method of claim 1, wherein the computer cluster includes a plurality of computer nodes, a given one of which is associated with label information that indicates to which one of the plurality of fault domains that the given computer node belongs.

6. The method of claim 5, wherein the provisioning of the new pod includes:
assigning the new pod to a particular computer node of a set of computer nodes that belongs to one of the plurality of fault domains, wherein the assigning causes a node agent executing on the particular computer node to instantiate an application of the new pod.

7. The method of claim 1, wherein the fault domain set object is accessed in response to the computer system receiving, from a user, an update to a desired state of a deployment of the service across the plurality of fault domains.

8. The method of claim 1, wherein a given one of the plurality of fault domains corresponds to a data center.

9. A non-transitory computer-readable medium having program instructions thereon that are capable of causing a computer system to perform operations comprising:
provisioning a plurality of pods across a plurality of fault domains, wherein a given one of the plurality of fault domains includes a respective set of computer nodes, and wherein the plurality of pods implement a service;
receiving an indication that a new pod is to be interleaved with the plurality of pods across the plurality of fault domains;
determining a current state of a computer cluster comprising the plurality of fault domains by iterating through a plurality of fault domain states, wherein a fault domain state is indicative of which pods are provisioned in a corresponding fault domain; and
based on at least the current state of the computer cluster, provisioning the new pod to one of the plurality of fault domains such that the current state is reconciled with a desired state defined by information associated with the service.

10. The non-transitory computer-readable medium of claim 9, wherein the operations further comprise:
accessing deployment information that specifies a set of properties, one of which controls how many pods can be provisioned to a fault domain, wherein the provisioning of the new pod is performed in accordance with the deployment information.

11. The non-transitory computer-readable medium of claim 9, wherein the operations further comprise:
accessing deployment information that specifies a set of properties, one of which controls how many pods can be provisioned to a computer node, wherein the provisioning of the new pod is performed in accordance with the deployment information.

12. The non-transitory computer-readable medium of claim 9, wherein the operations further comprise:
accessing deployment information that specifies a set of properties, one of which defines a minimum number of fault domains to use to provision the service, wherein the provisioning of the new pod is performed in accordance with the deployment information.

13. The non-transitory computer-readable medium of claim 9, wherein the operations further comprise:
grouping, by fault domain, a plurality of computer nodes of the computer cluster based on label information assigned to a given computer node,
wherein the provisioning of the new pod includes:
assigning the new pod to a particular computer node of a set of computer nodes that belongs to a selected one of the plurality of fault domains, wherein the assigning causes the new pod to be deployed on the particular computer node.

14. The non-transitory computer-readable medium of claim 9, wherein the indication corresponds to an update, received from a user via a user device, to the desired state associated with the service.

15. A system, comprising:
at least one processor; and
memory having program instructions stored thereon that are executable by the at least one processor to cause the system to perform operations comprising:
provisioning a plurality of pods across a plurality of fault domains, wherein a given one of the plurality of fault domains includes a respective set of computer nodes, and wherein the plurality of pods implement a service;
accessing a fault domain set object comprising a value indicating that a new pod is to be interleaved with the plurality of pods across the plurality of fault domains;
determining a current state of a computer cluster that includes the plurality of fault domains by iterating through a plurality of fault domain states, wherein a fault domain state is indicative of which pods are provisioned in a corresponding fault domain; and
based on at least the current state of the computer cluster and the value of the fault domain set object, provisioning the new pod to one of the plurality of fault domains such that the computer cluster achieves the value of the fault domain set object for interleaving pods across the plurality of fault domains.

16. The system of claim 15, wherein the operations further comprise:
accessing deployment information that specifies a set of properties, one of which controls how many pods can be provisioned to a fault domain, wherein the provisioning of the new pod is performed in accordance with the deployment information.

17. The system of claim 15, wherein the operations further comprise:
accessing deployment information that specifies a set of properties, one of which controls how many pods can be provisioned to a computer node, wherein the provisioning of the new pod is performed in accordance with the deployment information.

18. The system of claim 15, wherein the operations further comprise:
accessing deployment information that specifies a set of properties, one of which defines a minimum number of fault domains to use to provision the service, wherein the provisioning of the new pod is performed in accordance with the deployment information.

19. The system of claim 15, wherein the operations further comprise:
grouping, by fault domain, a plurality of computer nodes of the computer cluster based on label information assigned to a given computer node,
wherein the provisioning of the new pod includes:
assigning the new pod to a particular computer node of a set of computer nodes that belongs to a selected one of the plurality of fault domains, wherein the assigning causes the new pod to be deployed on the particular computer node.

20. The system of claim 15, wherein the fault domain set object is accessed in response to the system receiving, from a user, an update to a desired state of a deployment of the service across the plurality of fault domains.

* * * * *